Figure 1:
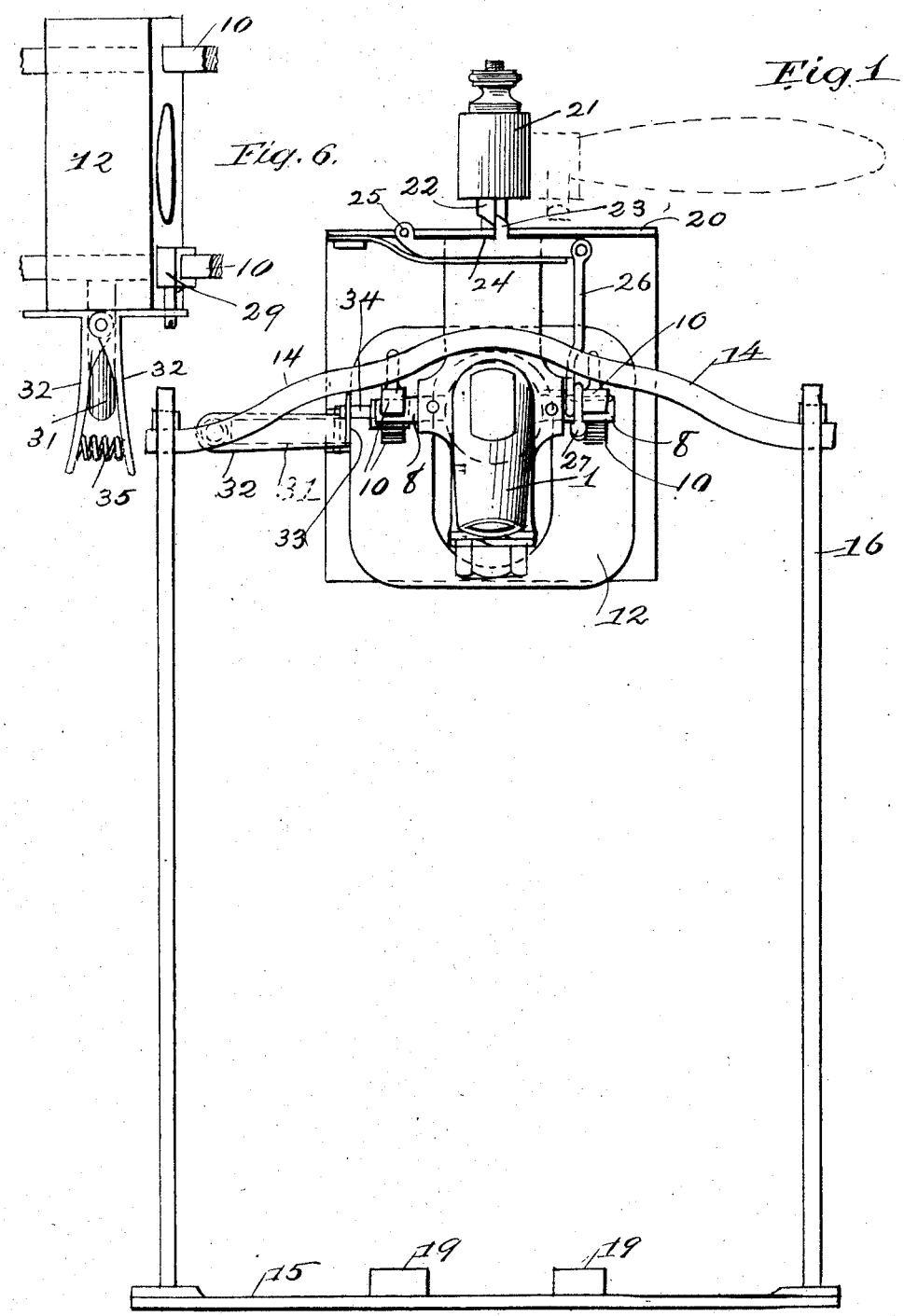

No. 880,893. PATENTED MAR. 3, 1908.
C. LEWIN.
WEIGHING FAUCET.
APPLICATION FILED JULY 29, 1907.

2 SHEETS—SHEET 1.

Witnesses
Geo. S. Cole
Geo. O. Willet

Inventor
Carl Lewin
by Wm. M. Monroe
Attorney

THE NORRIS PETERS CO., WASHINGTON, D. C.

No. 880,893. PATENTED MAR. 3, 1908.
C. LEWIN.
WEIGHING FAUCET.
APPLICATION FILED JULY 29, 1907.
2 SHEETS—SHEET 2.
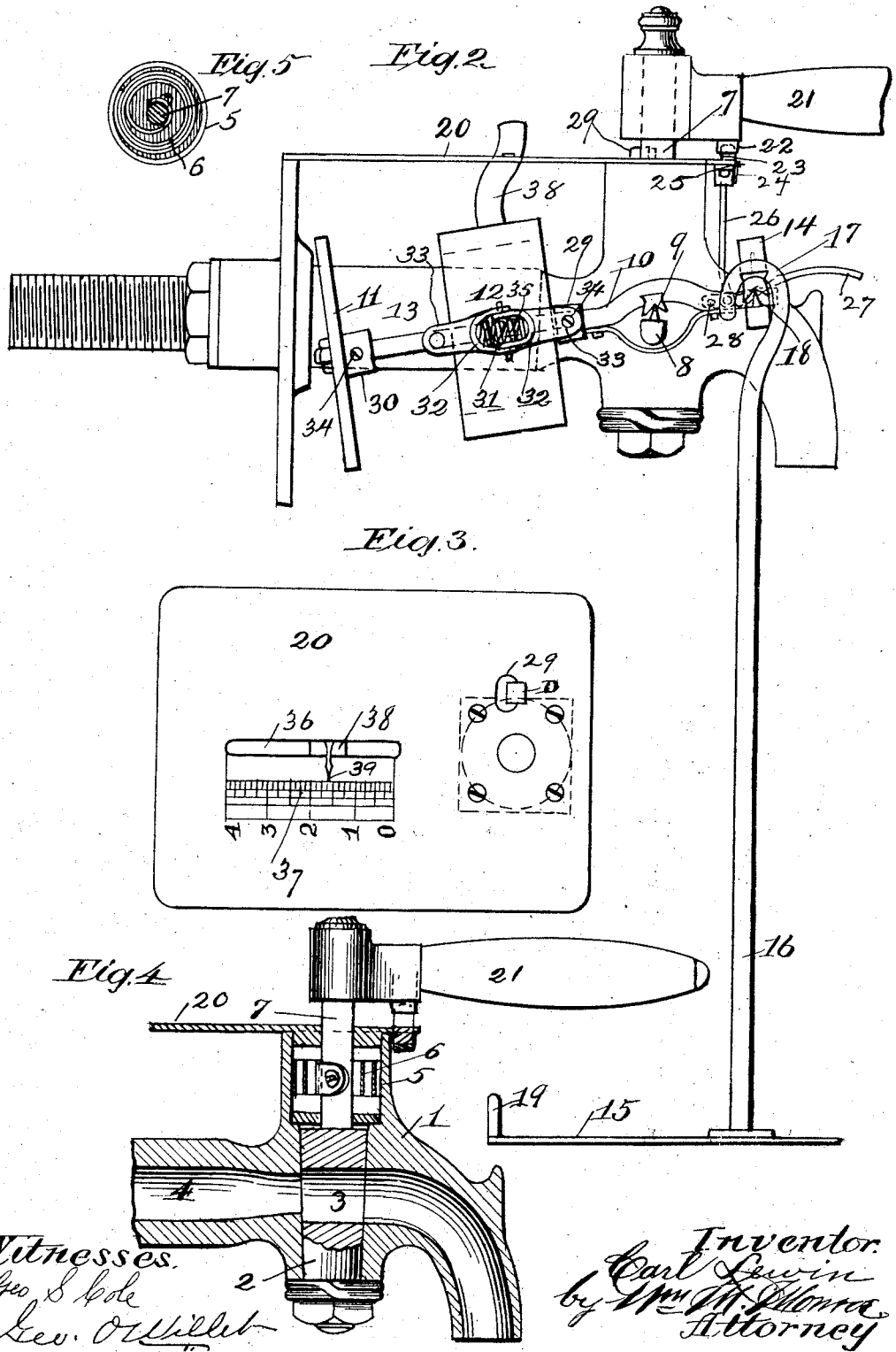

UNITED STATES PATENT OFFICE.

CARL LEWIN, OF CLEVELAND, OHIO.

WEIGHING-FAUCET.

No. 880,893.  Specification of Letters Patent.  Patented March 3, 1908.

Application filed July 29, 1907. Serial No. 386,037.

*To all whom it may concern:*

Be it known that I, CARL LEWIN, a citizen of the United States, and resident of Cleveland, county of Cuyahoga, State of Ohio, have invented certain new and useful Improvements in Weighing-Faucets, of which I hereby declare the following to be a full, clear, and exact description, such as will enable others skilled in the art to which it appertains to make and use the same.

The objects of the invention are to provide an automatically acting faucet by means of which the flow of fluid is cut off when a definite predetermined weight of the same has been served.

The objects are further to provide a compact and efficient as well as new and improved means for accomplishing these results.

The invention comprises the balancing arms mounted upon knife edges preferably secured upon the faucet, and a pendent platform upon which the receptacle for fluid is placed. Instrumentalities are also employed for automatically releasing the valve when the desired weight of fluid has been discharged.

The invention further comprises the combination and arrangement of parts and construction of details as hereinafter described, shown in the accompanying drawings and specifically pointed out in the claims.

In the accompanying drawings, Figure 1 is a front elevation of the device; Fig. 2 is a side elevation thereof; Fig. 3 is a plan view of the horizontal plate of the device upon which is placed the scale; Fig. 4 is a vertical central section of the faucet; Fig. 5 is a transverse section of the faucet barrel showing the return spring therein; and Fig. 6 is a plan view of the weight showing means for adjustably securing the weight upon the balancing arm.

In these views 1 is the faucet provided with a rotatable taper valve 2 having an opening 3 therethrough adapted to register with the faucet opening 4 when turned to coincide therewith. The barrel 5 of the faucet is hollow and within it is the coiled spring 6 which connects the valve stem 7 therewith so as to quickly shut the valve when released. The faucet is provided with the horizontal transversely placed arms 8 upon which are vertical knife edges 9. On these edges rest the balancing arms 10, 10 which are connected together at the rear by means of a plate 11, which encircles the cylindrical part 13 of the faucet.

A weight 12 is slidably mounted upon the balancing arms, and encircles the shank 13 of the faucet, and a yoke 14 joins the outer extremities of the arms which project beyond the fulcrum points thereof, thus forming a compact structure which takes up the minimum amount of space, and can be inclosed within a small case if necessary, so that the weighing mechanism will not be apparent.

From the yoke depends the weighing platform 15 by means of rods 16 and the eyes 17 thereon rest upon knife edges 18 upon the extremities of the yoke. Upon this platform the glass or vessel to receive the fluid is placed and lugs 19 at the rear edge thereof prevent the vessel from falling off.

It is important that as soon as the required weight of fluid is discharged from the faucet that the faucet should close automatically.

This is accomplished by means of a tripping device as follows: A horizontal plate 20 located over the platform is secured to the upper end of the faucet barrel 5 and forms a cover therefor. Through this plate projects the valve stem, and an arm 21 thereon forms a handle whereby the valve is opened.

A depending lug 22 from the hub of the arm engages a keeper 23, which is attached to a spring actuated arm 24 pivoted to the platform 20 at 25. This keeper will retain the valve when open, but is immediately depressed to liberate the lug 22 of the valve stem and permit the spring 6 to shut the valve as soon as the weight of the discharged fluid depresses the scale platform below. This is accomplished by means of the link 26, pivoted upon the arm 24 and the rock arm 27 which is pivoted to one of the balancing arms at 28.

The yoke engages the rock arm 27 and pulls it down as it descends, thus immediately liberating the valve which is shut quickly by the spring 6. The lug 29 on the plate 20 receives the lug upon the valve stem and serves to limit its movement, a rubber dam lessens the shock and noise.

An important feature of the invention is shown in the means for adjusting the position of the weight upon the balancing arms, so that the operator in his ordinary position can move the weights to any position required. For this purpose a sleeve 29 is shown in advance of the weight (in Fig. 2) and a similar sleeve 30 in the rear thereof. Supposing the drawer desires to draw a pint or pound of fluid at a time the sleeve in front is set at the position which will draw that weight of fluid. The second sleeve in the rear of the weight can then be set to the position at which the weight will correspond to two pints or two pounds of fluid, and the weight is provided with a projecting pin or handle 31 by means of which it can be readily changed from one position to another, even while in the act of serving customers. The weight can be locked quickly in either position by means of the handle clips 32, 32 which are flanged at the base at 33 and perforated to engage alternately with the set screws 34, 34 which secure the sleeves to the balancing arm. A spring 35 forces the clips outward.

The horizontal table above the faucet is provided with the opening 36 on one side of which is located a graduated scale 37 in pints or pounds and an arm 38 upon the weight extends through this opening and is provided with an indicator point 39. Since fluids differ greatly in weight, a pint of fluid is not necessarily a pound in weight, hence adjustment of the weights to draw a pint or a pound of any given fluid is constantly necessary and the more accessible the regulating mechanism, and simple the adjusting means, the better.

Having described the invention what I claim as new and desire to secure by Letters Patent is:—

1. In combination in a faucet, a tapered valve therein, provided with an opening adapted to register with the faucet opening, and valve stem, a platform mounted upon the faucet through which said valve stem passes, a hollow barrel for the faucet and coiled spring therein adapted to engage said valve stem and close said valve, knife edges extending laterally from said faucet, balancing arms, mounted upon said knife edges, one on each side of said faucet, a weight slidably mounted upon said arms, said weight provided with an opening through which said faucet extends, a yoke connecting the outer extremities of said arms, which project beyond the fulcrum points thereof, a weighing platform, knife edges upon the yoke, and rods having eyes resting upon said knife edges and connected at their lower ends with said platform, a lug upon said valve stem, a retaining device for said lug upon said platform and an actuating spring therefor, and mechanism for releasing said lug to close said valve, said mechanism operatively connected with one of said balancing arms and said yoke, an arm on said valve stem, and a stop on said plate for said arm on said valve stem.

2. In combination with a faucet, and tapered valve therefor, a valve stem for the valve, said valve and faucet having registering openings, a hollow barrel in said faucet, through which said valve stem projects, a closing spring for said valve, located in said barrel, knife edges extending laterally from said faucet one on each side thereof, balancing arms mounted on said knife edges on the faucet, a yoke connecting the outer ends of said balancing arms, a vertical plate connecting the inner ends of said balancing arms, said plate encircling said faucet, a movable weight on said arms, knife edges upon said yoke, a weighing platform depending from said knife edges on said yoke, a horizontal plate mounted upon said faucet, through which said valve stem projects, a lug upon said valve stem, a spring actuated arm pivoted to said platform adapted to engage said lug upon said valve stem and retain said valve in its open position, a rock arm pivoted upon one of said balancing arms, one end of which said yoke is adapted to engage as it descends, a link connecting said rock arm and said arm pivoted on said horizontal plate.

3. The combination with a faucet and rotatable valve and stem therefor, of a pair of knife edges upon the faucet at its sides, a pair of balancing arms upon the knife, a movable weight upon said arms, a yoke connecting their front extremities, a weighing platform suspended from said yoke, a lug on said valve stem, a fixed support on said faucet, a spring actuated arm on said support, adapted to engage said arm and hold said valve in the open position, and a link and rock arm device operatively connecting said spring actuating arm with one of said balancing arms, whereby when said arm falls, said spring actuated arm is withdrawn from contact with said lug on said valve stem.

4. In a weighing device for a faucet, the combination with the balancing arm and a knife edge upon the faucet, of a movable weight upon said arm, a movable sleeve in said arm in advance of said weight, and a similar sleeve in the rear of said weight, means for moving said weight to the required position, means for securing said sleeves upon said arm, and means for detachably securing said weight alternately to said sleeves, substantially as described.

In testimony whereof I hereunto set my hand this 12" day of July 1907.

CARL LEWIN.

In presence of—
WM. M. MONROE,
GEO. S. COLE.